H. S. Boynton,
Clothes Frame,

No. 76,589.  Patented Apr. 14, 1868.

Witnesses;
John D. Fordirick
Arthur Holmes

Inventor;
H Storrs Boynton

United States Patent Office.

H. STORRS BOYNTON, OF CORTLAND, NEW YORK.

Letters Patent No. 76,589, dated April 14, 1868.

IMPROVED ADJUSTABLE CLOTHES-DRIER.

*The Schedule referred to in these Letters Patent and making part of the same.*

TO ALL WHOM IT MAY CONCERN:

Be it known that I, H. STORRS BOYNTON, of Cortland, in the county of Cortland, in the State of New York, have invented a new and improved Adjustable Clothes-Line; and I do hereby declare that the following is a full and exact description thereof, reference being had to the accompanying drawings, and the letters of reference marked thereon.

Figure 1:
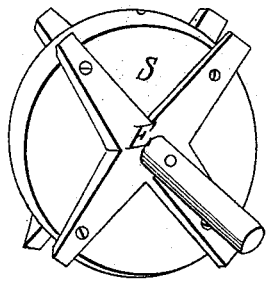
Figure 1 shows the wheel and axle detached.
Figure 2:
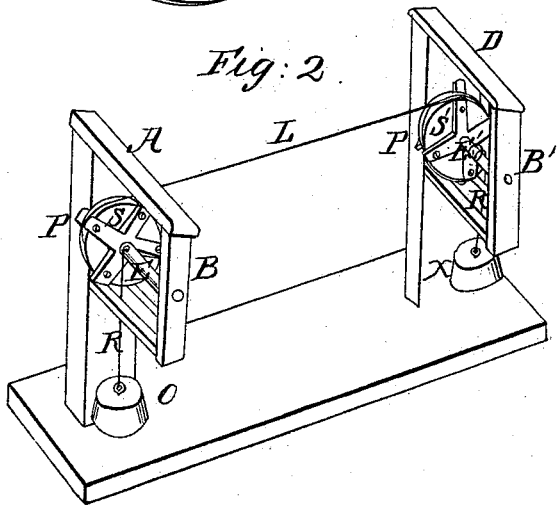
Figure 2 is a view of the line prepared for operation.

To enable others skilled in the art to make and use my invention, I will proceed to describe its construction and operation.

To a post or standard I attach the necessary framework to receive and support a wheel turning upon an axle. I have two of these, at a desired distance from each other. The wheels are constructed of wood or any suitable material, and are so constructed as to receive and hold the line. To each of the axles is attached a line, rope, chain, or strap, supporting weights at the extreme ends. The diameters of the wheels and axles are made to answer the end in view, as to the distance the one post is to be from the other. A wheel one foot in diameter, axle two inches, and posts six feet high, will give a play of thirty feet in the line. Increasing the diameter of the wheel, or lessening that of the axle, gives greater length to the line extension. The weights attached to the rope from the axle should be sufficient to secure proper tension to the line, and be equal.

I operate my invention substantially as follows: Having placed the wheels S S', each resting upon its axle, E E', in proper position in the posts P P' and framework B B', which receive the other arm of the axles, I wind the line L, securing one end around the wheel at the home-station A, and carry the other end of the line to the distant station, D. The end of the line may be armed with a snap or hook, for convenience in attaching or unloosing it from a staple or ring in the wheel S'. When thus secured, the line extends from wheel to wheel, with a coil around the wheel S, of length of line equal to the distance between the stations. The weights are then secured, and it is adjusted for operation. When the coil is around the wheel S, the weight O is out at full length of the rope R, and the weight X is drawn up to the axle E'. The weights hold the line firmly drawn, and at the same time, being equal, the line is moved back and forth by a touch. Stationed at A, the operator secures a garment upon the line, and, taking hold of the line, moves it towards station D, and so repeats the process until the entire line is full between the stations. It will be observed that as the line is paid out from one wheel, the coil is made upon its opposite. The wheels may be secured to any convenient object, or two posts may be set at proper distance, each from the other, into which the axle is secured  The home-station may be located in such convenient position as to least expose the person to out-door weather in putting out and taking in clothing. It may be provided with a covering, and, when not in use, the line may be detached from the distant station, and coiled around the wheel under cover.

My invention is inexpensive in construction. The wheels may be cut from ordinary plank, and the weights may be boxes filled with stones. Its cheapness is only equalled by its convenience. It does away with digging paths in snow, and walking through wet grass, and of carrying baskets of wet clothing. It may be so attached to the house that it may be operated without stepping from the house.

What I claim as my invention, and desire to secure by Letters Patent, is—

The mode of constructing and operating an adjustable clothes-line upon wheels or pulleys, and regulated by weights consisting of the line L, in combination with the wheels S S', and the weights O X and axles E E', with the posts P P' and framework B B', all constructed and operated substantially as set forth.

H. STORRS BOYNTON.

Witnesses:
 JOHN D. FREDERICK,
 ARTHUR HOLMES.